United States Patent [19]

Bjorkman, Jr. et al.

[11] Patent Number: 4,678,656
[45] Date of Patent: Jul. 7, 1987

[54] FORMATION OF DENSE CHLORINE HYDRATE

[75] Inventors: Harry K. Bjorkman, Jr.; Peter Carr, both of Greensboro, N.C.

[73] Assignee: Energy Development Associates, Inc., Greensboro, N.C.

[21] Appl. No.: 752,349

[22] Filed: Jul. 5, 1985

Related U.S. Application Data

[63] Continuation-in-part of Ser. No. 673,223, Nov. 20, 1984, abandoned, which is a continuation of Ser. No. 475,184, Mar. 14, 1983, abandoned.

[51] Int. Cl.$^4$ .......................... C01B 7/01; H01M 8/06
[52] U.S. Cl. ...................................... 423/500; 429/15; 429/17; 429/19; 429/20
[58] Field of Search .................. 423/462, 472, 500; 429/15, 17, 19, 20, 105, 200; 204/94

[56] References Cited

U.S. PATENT DOCUMENTS 4,386,140  5/1983  Bjorkman, Jr. et al. ............. 429/19
4,594,298  6/1986  Shimizu et al. ..................... 429/105

OTHER PUBLICATIONS

Chemistry, John C. Bailar, Jr. et al, Academic Press, 1978, pp. 323–324.
Mellor's Comprehensive Treatise on Inorganic & Theoretical Chemistry, Longmans, Green, and Co., 1956, Supplement II, Part I, p. 364.

*Primary Examiner*—John Doll
*Assistant Examiner*—Jeffrey Edwin Russel
*Attorney, Agent, or Firm*—Harness, Dickey & Pierce

[57] ABSTRACT

A method of forming chlorine hydrate is described which generally comprises, combining liquid chlorine with an aqueous liquid, and removing the heat of hydrate formation. This method may also include the steps of mixing the liquid chlorine with the aqueous liquid, and cooling the chlorine hydrate to provide a pressure decrease. However, in accordance with the present invention, no refrigeration of the aqueous liquid is required, as the heat of formation may be released to a substantially room temperature environment.

12 Claims, 2 Drawing Figures

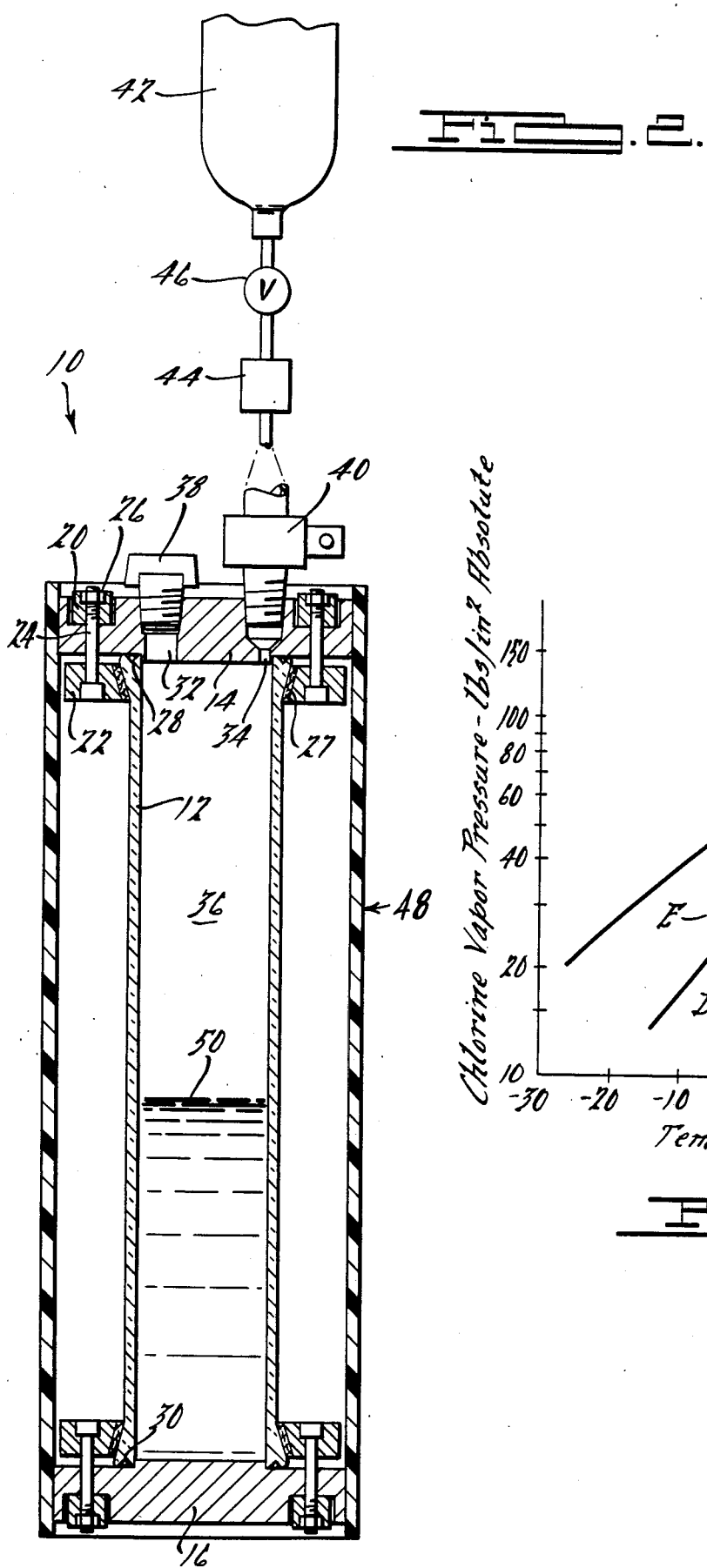

FORMATION OF DENSE CHLORINE HYDRATE

CROSS-REFERENCE TO RELATED APPLICATION

This application is a continuation-in-part of co-pending application Ser. No. 673,223, filed Nov. 20, 1984, entitled "FORMATION OF DENSE CHLORINE HYDRATE", and now abandoned, which is a continuation of Ser. No. 475,184, filed Mar. 14, 1983, entitled "FORMATION OF DENSE CHLORINE HYDRATE" which is now abandoned.

BACKGROUND AND SUMMARY OF THE INVENTION

The present invention relates generally to an improved method of forming chlorine hydrate, and particularly a method of forming chlorine hydrate for a zinc-chloride secondary energy storage battery system which does not require refrigeration equipment.

The secondary energy storage systems of the type referred to herein (e.g., a zinc-chloride battery system or other suitable metal-halogen battery system) generally are comprised of three basic components, namely an electrode stack section, an electrolyte circulation subsystem, and a store subsystem. The electrode stack section typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous zinc-chloride electrolyte. The electrolyte circulation subsystem operates to circulate the zinc-chloride electrolyte from a reservoir through each of the cells in the electrode stack in order to replenish the zinc and chloride electrolyte components as they are oxidized or reduced in the cells during the battery cycle. In a closed, self-contained zinc-chloride battery system, the storage subsystem is used to contain the chlorine gas which is liberated from the cells during the charging of the battery system for subsequent return to the cells during the discharging of the battery system. In such a zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting the temperature to increase, such as by circulating a warm liquid through the store container. The chlorine gas thereby recovered is returned to the electrode stack via the electrolyte circulation subsystem, where it is reduced at the chlorine electrodes. Simultaneously, the zinc metal is dissolved off of the zinc electrode substrates, and power is available at the battery terminals.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 3,809,578 entitled "Process For Forming And Storing Halogen Hydrate In A Battery"; Carr U.S. Pat. No. 4,100,332 entitled "Comb Type Bipolar Electrode Elements And Battery Stack Thereof". Such systems are also described in published reports prepared by the assignee herein, such as "Development of the Zinc-Chloride Battery for Utility Applications," Interim Report EM-1417, May 1980; "Development of the Zinc-Chloride Battery for Utility Applications," Interim Report EM-1051, April 1979, both prepared for the Electric Power Research Institute, Palo Alto, Calif.; "Zinc-Chloride Electric Engine Unit for Four-Passenger Electric Vehicle", SAE Reprint May 1981 from Electric And Hybrid Vehicle Progress, p-91, April 1981; and "Recent Advances In Zinc-Chloride Battery Technology" published in Proceedings of 30Th Power Sources Symposium, June 1982. The specific teachings of the aforementioned cited references are incorporated herein by reference.

Extensive efforts have been taken over many years to develop techniques for forming a halogen hydrate. Indeed, these efforts have given rise to several inventions for which commonly assigned patents have been granted or are currently pending, including: U.S. Pat. Nos. 3,713,888 and 3,809,578 identified above; Bjorkman U.S. Pat. No. 3,783,027 entitled "Apparatus And Method For Making Chlorine Hydrate From High Energy Density Battery Electrolyte And Chlorine"; Behling U.S. Pat. No. 3,793,077 entitled "Battery Including Apparatus For Making Halogen Hydrate"; Bjorkman U.S. Pat. No. 3,814,630 entitled "Filter/Store For Electric Energy Storage Device"; Bjorkman U.S. Pat. No. 3,823,036 entitled "Secondary Battery Comprising Means For Forming Halogen Hydrate Solid Bubble Shells"; Bjorkman U.S. Pat. No. 3,840,650 entitled "Stable Chlorine Hydrate"; Symons U.S. Pat. No. 3,907,592 entitled "Halogen Hydrates"; Symons U.S. Pat. No. 3,908,001 entitled "Manufacture of Chlorine Hydrate"; Symons U.S. Pat. No. 3,935,024 entitled "Halogen Hydrates"; Symons U.S. Pat. No. 3,940,283 entitled "Halogen Hydrates"; Carr et al U.S. Pat. No. 4,146,680 entitled "Operational Zinc Chlorine Battery Based On A Water Store"; Behling U.S. Pat. No. 4,115,529 entitled "Halogen Hydrate Formation From Halogen And Finely Divided Aqueous Droplets"; U.S. Pat. No. 4,306,000 entitled "Method Of Cooling Zinc Halogen Batteries"; Kodali U.S. patent application Ser. No. 310,627 filed Oct. 13, 1981 entitled "Metal Halogen Battery Construction With Improved Technique For Producing Halogen Hydrate"; U.S. patent application Ser. No. 357,742 filed Mar. 12, 1982 entitled "Halogen Hydrate Storage Device For Mobile Zinc-Chloride Battery System"; U.S. patent application Ser. No. 368,892 filed Apr. 16, 1982 entitled "Multiple Stage Multiple Filter Hydrate Store"; and U.S. patent application Ser. No. 358,628 filed Mar. 16, 1982 entitled "Metal Halogen Battery System With Multiple Outlet Nozzle For Hydrate". The specific teachings of these references are incorporated herein by reference. These are now, respectively, U.S. Pat. No. 4,385,099, issued May 24, 1983; U.S. Pat. No. 4,400,446, issued Aug. 23, 1983; U.S. Pat. No. 4,386,140, issued May 31, 1983; and U.S. Pat. No. 4,389,468, issued June 21, 1983.

Generally speaking, it is desirable to concentrate or otherwise form a dense chlorine hydrate in order to reduce the size and/or weight of the hydrate store. This consideration is particularly important when the zinc-chloride battery is used to power an electric vehicle, where the size and weight of the hydrate store will have a significant effect on the operating range of the electric vehicle. Although highly compressed chlorine hydrate has been employed in the past to reduce the size and weight of the hydrate store, one of the principal techniques for increasing the density of the chlorine hydrate is to employ filtration in the hydrate store compartment. Examples of such filtration techniques may be found in the U.S. Pat. No. 3,814,630 and the U.S. patent application Ser. No. 368,892 identified above.

The purpose of the filter in the hydrate store is to separate the compressible particulate chlorine hydrate form the liquid used in the hydrate formation process. As the chloride hydrate enters the store, it is in the form of a dilute slurry, of which approximately three (3) to seven (7) percent is hydrate crystal. However, due to the amount of chlorine gas which is liberated during the charging of the battery, it is not practical to store the chlorine hydrate particles in this dilute slurry. Accordingly, a filter is used to provide a hydrate concentration system for removing as much of the excess liquid as possible. Thus, it will be appreciated that the increase in the density of the hydrate particles in the store will result in a decrease in the size and weight of the battery system.

The practical levels of chlorine hydrate packing by filtration in a zinc-chloride battery system having a capacity on the order 50 kWh appear to be approximately 0.15-0.17 gm $Cl_2$/gm of total chlorine and water stored. These levels should be compared with the maximum theoretical chlorine hydrate densities of 0.33 gm $Cl_2$/gm where the hydrate is comprised of $Cl_2.8H_2O$ and 0.4 gm $Cl_2$gm where the hydrate is comprised of $Cl_2.6H_2O$.

Accordingly, it is a principal object of the present invention to provide a method of forming chlorine hydrate which more closely approaches the maximum theoretical density levels.

It is another object of the present invention to provide a method of forming highly dense chlorine hydrate without requiring a refrigeration system.

It is a further object of the present invention to provide a method of forming highly dense chlorine hydrate for which the heat of formation may be removed directly to the enviroment.

It is an additional object of the present invention to provide a method of forming highly dense chlorine hydrate in situ.

It is another object of the present invention to provide a method of forming highly dense chlorine hydrate such that a relatively smaller hydrate store volume is required.

It is yet another object of the present invention to provide a method of forming highly dense chlorine hydrate as part of a method of charging a zinc-chloride battery system used to power an electric vehicle.

To achieve the foregoing objects, the present invention provides a method of forming chlorine hydrate which generally comprises, combining liquid chlorine with an aqueous liquid at a pressure below 100 psig, and removing the heat of hydrate formation to a substantially ambient temperature environment up to approximately 26° C. This method may also include the steps of mixing the liquid chlorine with the aqueous liquid, and cooling the chlorine hydrate to provide a pressure decrease. However, in accordance with the present invention, no refrigeration of the aqueous liquid is required, as the heat of formation may be released to a substantially ambient temperature environment.

Additional advantages and features of the present invention will become apparent from a reading of the detailed description of the preferred embodiments which makes reference to the following set of drawings in which:

BRIEF DESCRIPTION OF THE DRAWINGS

FIG. 1 is a graph of an equilibrium diagram with respect to chlorine and various chlorine hydrate formulations.

FIG. 2 is a simplified view, partially in cross-section, of a chlorine hydrate store container in accordance with the present invention.

DETAILED DESCRIPTION OF THE PREFERRED EMBODIMENTS

In its broader aspects, chlorine hydrate may be formed in accordance with the present invention by combining liquid chlorine with an aqueous liquid, and removing the heat of hydrate formation. The aqueous liquid may be any suitable water-based liquid which will facilitate the formation of chlorine hydrate. Thus, while water is preferred as the aqueous liquid, other suitable water-based liquids may be employed, such as zinc-chloride electrolyte.

One of the principal advantages of this method of forming chlorine hydrate is that no refrigeration is required, as in previous methods where the aqueous liquid had to be chilled to a temperature typically between −8° to +6° C. in order to form hydrate with chlorine in a gaseous state. Moreover, this method is effective at a temperature of up to approximately 26° C. Thus, the aqueous liquid may be combined with the liquid chlorine at temperatures as high as typical room temperature or substantially ambient temperatures without refrigeration.

Where the method of forming chlorine hydrate in accordance with the present invention is used as part of a method of charging a zinc-chloride battery, it will be appreciated that the gaseous chlorine generated in the stack secton must first be converted to liquid chlorine. Although the energy expended in this conversion may offset at least in part the energy saved by eliminating the refrigeration equipment, it is important to note that the chlorine hydrate formed in accordance with the present invention is considerably more dense than the chlorine hydrate typically formed via refrigeration and condensed by filtration. For example, experimentation has shown that a chlorine hydrate density of 0.32 gm Cl$_2$/gm of total chlorine and water stored (where the hydrate is comprised of Cl$_2$·8.4H$_2$O) is achievable. Thus, another advantage of the present invention is that the size and weight of the hydrate store may be reduced. This consideration is, of course, very important when a zinc-chloride battery is used to power an electric vehicle. A smaller and lighter hydrate store will not only increase the operating range of the electric vehicle, but will also permit the zinc-chloride battery to be employed in relatively compact-sized electric vehicles.

Another advantage of the present invention is that the chlorine hydrate may be formed "in situ". That is, the chlorine hydrate may be formed in the same vessel or container in which the liquid chlorine and the aqueous liquid are combined. In prior hydrate formation processes where the chlorine hydrate is first formed in a pump or conduit and conveyed to a store compartment, there was a tendency for this conduit to become plugged or blocked with hydrate during the latter part of the battery charging process. Since the chlorine hydrate is formed in the same vessel where the liquid chlorine and the aqueous liquid are combined, there is no need to convey the hydrate to another compartment, thereby eliminating any possible blockage that could otherwise occur in the conduit used to convey the hydrate.

A further advantage of the present invention is that the heat of hydrate formation may be removed to a substantially ambient temperature environment surrounding the vessel in which the hydrate is formed. Thus, the need to insulate the hydrate store from the environment in order to maintain the chlorine hydrate at a chilled temperature is considerably reduced or eliminated. Thus, it may be advisable to construct the store compartment such that is is capable of releasing heat to the environment.

While it should be appreciated that in the appropriate application it may be advisable to assist the removal of the heat of hydrate formation by providing some cooling during or after the chlorine hydrate is formed, it should be understood that this step is not essential to practicing the present invention. Similarly, while it may also be appropriate to control the temperature of the aqueous liquid before of during the formation of chlorine hydrate, such as cooling the aqueous liquid until a predetermined temperature is reached, again it should be understood that this step is not essential to practicing the present invention.

An additional step to the present method which is preferred, but may not be essential under the appropriate circumstances, is to mix the liquid chlorine with the aqueous liquid. This mixing may be achieved by a variety of suitable means, such as agitating, stirring, shaking, blending, intermingling, or otherwise bringing the liquid chlorine and the aqueous liquid in close association or intimate contact. Preferably, the mixing step should occur concomitantly with the step of removing the heat of hydrate formation. Indeed the steps of combining the liquid chlorine with the aqueous liquid (such as by adding these two components to a vessel), mixing these two components together, and removing the heat of hydrate formation may all occur concomitantly. However, other suitable timing relationships may also be provided in the appropriate application.

Referring to FIG. 1, an equilibrium diagram with respect to chlorine and varius chlorine hydrate formulations is shown. The curves contained in this equilibrium diagram are used to illustrate the pressure and temperature relationships associated with the present invention. For example, the curve labeled "A" represents the chlorine vapor pressure over chlorine liquid with respect to temperature. Curve "A" illustrates that when the liquid chlorine is added or otherwise introduced to the vessel in which the hydrate is to be formed, it will be under a relatively high pressure.

Assuming that the vessel is at a lower pressure than that of the liquid chlorine prior to its introduction to the vessel, a portion of the liquid chlorine will evaporate as it is introduced to the vessel. This evaporation will continue until the pressure in the vessel rapidly rises to a level depending upon the quantity of liquid chlorine supplied to the vessel. For example, the pressure in the vessel will typically increase to a range generally between 70 and 85 p.s.i., whereby a substantial portion of the liquid chlorine supplied will remain in its initial liquified state.

Curves "B" through "E" represent the temperatures and pressures required in order to form chlorine hydrate where various aqueous liquids are employed. Curve "B" represents chlorine hydrate formed with water, while curves "C" through "E" represent chlorine hydrate formed with mixtures of water with zinc-chloride electrolyte. Thus, for example, curve "C" represents chlorine hydrate formed with a 16% concentration of zinc-chloride in water, while curve "D" represents chlorine hydrate formed with a 26% concentration of zinc-chloride in water, and curve "E" represents chlorine hydrate formed with a 40% concentration of zinc-chloride in water.

Accordingly, it may be seen from curves "B" through "E" that chlorine hydrate may be formed at a low pressure when the temperature is also appropriately low. Additionally, it may be seen that chlorine hydrate may be formed at a high temperature where the pressure is also appropriately high. These prior known pressure and temperature relationships indicate, for example, that after the chlorine hydrate is formed in accordance with the present invention, the pressure in the vessel may be decreased by providing some cooling to the chlorine hydrate. This cooling may be provided by any conventional means, such as by heat exchange with a cold or cooled liquid (i.e. water).

It should also be noted that it may be advisable to control the relative quantities of liquid chlorine and the aqueous liquid being added to the vessel in order to convert as much of these components to chlorine hydrate as possible. Theoretically, the liquid chlorine and the aqueous liquid should be predetermined amounts which will ensure a complete conversion to chlorine hydrate. However, as a practical matter, if precise control over these quantities cannot be obtained, or if the liquid chlorine and the aqueous liquid are not sufficiently mixed, a complete conversion will not occur and some free liquid chlorine and/or some free aqueous liquid will remain. Thus, for example, a situation could arise after the hydrate formation process is generally completed where there is some liquid chlorine left at the bottom of the vessel, very dense chlorine hydrate adjacent to this liquid chlorine, less dense chlorine hydrate near the top of the vessel, some aqueous liquid trapped between layers of hydrate, and some gaseous chlorine at the top of the vessel above the hydrate.

While the pressure in the vessel at the end of the chlorine hydrate formation process will be dependent upon the temperature within the vessel, this pressure should typically be between 50-70 p.s.i. Where this process is employed in a zinc-chloride batter, it should be noted that this pressure will be quickly reduced (i.e. within the first 10% of discharge) to operating pressures between 0-10 p.s.i. through the release of chlorine to the battery stack section. Additionally, this pressure may also be reduced by providing cooling after the hydrate is formed. Indeed, sufficient cooling may be provided to reduce the pressure within the vessel to ambient pressure, if desired.

Additionally, it should be appreciated that while no refrigeration equipment is required to form the chlorine hydrate at typical room temperatures, the temperature of the surrounding enviroment may be sufficiently high (i.e. generally greater than 28.3° C.) that some cooling or refrigeration equipment may be needed in order to remove the heat of hydrate formation. Nevertheless, the amount of such cooling or refrigeration would be substantially less than that required to chill the aqueous liquid to a temperature typically between −8° to +6° C. as in previous chlorine hydrate formation methods.

Turning now to a description of a store container or vessel utilized to practice the present invention, it should be understood that this vessel was constructed for experimental and demonstration purposes and that the present invention is not limited to any particular vessel shape or design. Thus, for example, while the vessel described herein is cylindrical, the vessel may also be spherical in shape, and so forth.

Referring to FIG. 2, a simplified view of a chlorine hydrate store container 10 in accordance with the present invention is shown. The store container 10 generally comprises a glass tube 12, a plastic top cover 14, and a plastic base plate 16. The top cover 14 is secured to the tube 12 by a pair of clamping rings 20 and 22, and a plurality of circumferentially spaced bolts 24 and nuts 26. A split-ring fiberous grommet 27 is interposed between the clamping ring 22 and the glass tube 12 in a conventional manner. The base plate 16 is also secured to the tube 12 in the same way as described above for the top cover 14. A pair of gaskets 28 and 30 are also provided to facilitate a fluid-tight seal between the tube 12 and the top cover 14 and between the tube 12 and the base plate 16.

The top cover 14 is provided with two apertures 32 and 34 for permitting access to the internal chamber 36 defined by the tube 12, the top cover 14 and the base plate 16. For example, the aperture 32 is used to introduce or otherwise add an aqueous liquid to the chamber 36, and the aperture 34 is used to introduce or otherwise add liquid chlorine to the chamber 36. To hermetically seal the aperture 32 and permit the chamber 36 to become pressurized during the hydrate formation process, a plastic plug 38 is inserted into the aperture. Similarly, the aperture 34 is sealed by a valve 40 which is mounted to the store container 10 via a threaded connection.

In order to introduce liquid chlorine to the chamber 36, a suitable source of liquid chlorine, such as a conventional chlorine cylinder 42 is coupled to the valve 40 by a coupling 44. Liquid chlorine may then be supplied to the chamber 36 by opening both the chlorine cylinder valve 46 and the store container valve 40. Where the present invention is practiced in a zinc-chloride battery, it should be appreciated that the source of liquid chlorine would be derived from the battery stack section rather than a chlorine cylinder.

The store container 10 may be made from any suitable material which will be chemically resistive or inert to the chemical entities with which it will come into contact, such as liquid/gaseous chlorine and the aqueous liquid. Thus, for example, the top cover 14, the base plate 16, the plug 38, and so forth may be made from a variety of materials; these materials may include respectively, without limitation, Teflon (a DuPont trademark), Kynar (a Penwalt trademark), and Polyvinyl Chloride (preferably Boltron 4008-2124 made by the General Tire & Rubber Corp.). Other examples of suitable materials may be found in the 1980 "Development of the Zinc-Chloride Battery For Utility Applications" report identified previously.

With respect to the tube 12, this tube may also be made in whole or part from one of the above materials. However, it should be noted that in one form of the present invention, the tube 12 should be constructed such that it is capable of releasing heat from the chamber 36 to the environment. It may also be noted that the store container 10 is provided with a plastic cylinder-shaped shield 48, which includes a plurality of apertures for facilitating the removal of heat form the chamber 36.

Additionally, the gaskets 28 and 30 may be made from any suitable sealing material, which is also chemically resistive or inert to the chemical entities with which it will come into contact. Examples of such sealing materials are polytetrafluoroethylene and Viton fluoroelastomers. Other examples of suitable materials may be found in the 1980 "Development of the Zinc-Chloride Battery For Utility Applications" report identified previously.

In one form of the present invention, the aqueous liquid is added to the store container 10 before liquid chlorine is added. The aqueous liquid may be added to some appropriate level, such as the level indicated by reference numeral 50. Additionally, before the plug 38 is used to seal the aperture 32, it may be advantageous to purge all or substantially all of the air from the chamber 36. This purging is preferably achieved by replacing the air in the gas space of chamber 36 with gaseous chlorine.

When the valves 40 and 46 are opened, a portion of the liquid chlorine supplied to the chamber 36 will evaporate. This evaporation is an endothermic reaction, with a heat of chlorine evaporation being −4.8 K Cal/mole at atmospheric pressure. This will cause some cooling to occur in the chamber 36. However, this cooling will be offset by the heat of hydrate formation, which is 18.6 K Cal/mole at atmospheric pressure. This heat of hydrate formation will be readily removed from the chamber 36 through the glass tube 12 to the room temperature environment surrounding the store container 10.

As determined by experimentation using the apparatus of FIG. 2, chlorine hydrate may be formed from liquid chlorine and water at ambient temperatures up to 26° C. with an associated pressure of approximately 100 psig +1 psig. Expressed in terms of the lines shown in FIG. 1, this hydrate is being formed in the area between lines A and B. Formation of this hydrate in this region is instantaneous when the chlorine is mixed with the water. If not mixed, globules of liquid chlorine become encrusted with solid hydrate and the formation rate is then very, very slow.

Hydrate thus formed is stable as temperature is increased until the temperature has reached 28.5°C. to 29.0°C. at which point liquid chlorine again begins to appear. This conversion of chlorine hydrate back to liquid chlorine is either incomplete or very, very slow (requiring more than four hours) even with agitation at temperatures below 29.8° C. At temperatures above 30° C., the hydrate completely decomposes so that only liquid chlorine and water are present. The pressure at which this occurs is 109 psig and there is no pressure change during the conversion. Expressed again in terms of FIG. 1, this increasing temperature experimentation covers experimentation which follows line B up past the point where line B crosses line A.

The hydrate decomposed as described above could not be reformed until the temperature was 25.5° C. This is believed to be due to supersaturation and the absence of nucleation sites to start crystalization. Conversely, when the mixture was taken to 29.8° C., and there was still some particulate hydrate present, the hydrate began to readily reform at 28.3° C. Since both experiments were conducted inside the same closed flask with no change in contents, it is believed that the difference was due to the nucleation sites present in the form of hydrate crystals and that difficulty in initially forming above 26° C. is due to supersaturation. Reduction of pressure to 80 psig at a temperature of approximately 26° C. results in a decomposition of the hydrate so that only gas and liquid water are present.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

We claim:

1. A method of forming chlorine hydrate, comprising the steps of:
   (a) providing a vessel capable of being sealed off from the ambient environment;
   (b) adding a quantity of an aqueous liquid to said vessel;
   (c) adding liquid chlorine into said vessel in a quantity such that a portion of the liquid chlorine evaporates until the pressure in said vessel is below 100 psig, but above those chlorine vapor pressures necessary for the formation of chlorine hydrate in the temperature range +6° C. to +20° C., and said pressure is maintained throughout the formation of chlorine hydrate;
   (d) sealing the vessel;
   (e) allowing the quantity of aqueous liquid to react with the remaining liquid chlorine to form chlorine hydrate; and
   (f) removing the heat of hydrate formation to an environment having a temperature of approximately +6° C. up to a room temperature of approximately 26°C.

2. The method according to claim 1 wherein said aqueous liquid is added to said vessel before said liquid chlorine is added to said vessel.

3. The method according to claim 1 further including the step of mixing said liquid chlorine with said aqueous liquid.

4. The method according to claim 3, wherein said mixing step occurs concomitantly with said step of removing the heat of hydrate formation.

5. The method according to claim 1, wherein said step of adding said liquid chlorine to said vessel, said step of adding said aqueous liquid to said vessel and said step of mixing said liquid chlorine with said aqueous liquid all occur concomitantly.

6. The method according to claim 1 wherein said aqueous liquid is water.

7. The method according to claim 1 wherein said aqueous liquid is an aqueous electrolyte.

8. The method according to claim 1, further including the step of maintaining the temperature of said aqueous liquid within the temperature range +6° C. to +20° C. before said aqueous liquid is combined with said liquid chlorine.

9. The method according to claim 1 including the step of cooling said chlorine hydrate such that the pressure inside said vessel decreases.

10. The method according to claim 1, wherein said method of forming chlorine hydrate forms part of a method for charging a zinc-chloride battery.

11. A method of forming chloride hydrate as part of a method of charging a zinc-chloride battery contained in an electric vehicle, comprising the steps of:
   (a) providing a vessel capable of being sealed off from the ambient environment;
   (b) adding a predetermined quantity of an aqueous liquid to said vessel;
   (c) adding liquid chlorine into said vessel in a quantity such that a portion of the liquid chlorine evaporates until the pressure in said vessel is below 100 psig, but above those chlorine vapor pressures, specified in FIG. 1, necessary for the formation of chlorine hydrate in the temperature range +6° C. to +20° C. and said pressure is maintained throughout the formation of chlorine hydrate;
   (d) sealing the vessel;
   (e) allowing the quantity of aqueous liquid to react with the liquid chlorine to form chlorine hydrate; and
   (f) removing the heat of hydrate formation to a substantially ambient room temperature environment up to approximately +26°C.

12. The method according to claim 11, including the step of cooling said chlorine hydrate, such that the pressure inside said vessel decreases.

* * * * *

UNITED STATES PATENT AND TRADEMARK OFFICE
CERTIFICATE OF CORRECTION

PATENT NO. : 4,678,656

DATED : July 7, 1987

INVENTOR(S) : HARRY K. BJORKMAN, JR., and PETER CARR

It is certified that error appears in the above-identified patent and that said Letters Patent is hereby corrected as shown below:

Column 3, line 33, delete "form" and substitute therefor --from--.

Column 5, line 46, delete "of" first occurrence and substitute therefor --or--.

Column 7, line 3, delete "batter" and substitute therefor --battery--.

Column 8, line 23, delete "form" and substitute therefor --from--.

Column 8, line 59, delete "+" and substitute therefor --$\pm$--.

Column 10, line 32, Claim 11, please delete "chloride" and substitute therefor --chlorine--.

Signed and Sealed this

Twenty-ninth Day of March, 1988

Attest:

DONALD J. QUIGG

*Attesting Officer*  *Commissioner of Patents and Trademarks*